(12) United States Patent
Jain et al.

(10) Patent No.: US 7,152,332 B1
(45) Date of Patent: Dec. 26, 2006

(54) NAVIGATIONAL ASSIST SYSTEM

(76) Inventors: Ashish Kumar Jain, 2522 Warm Springs Rd., Columbus, GA (US) 31506; Gerald Lamar Miley, 5310 Shanna La., Columbus, GA (US) 31506

( * ) Notice: Subject to any disclaimer, the term of this patent is extended or adjusted under 35 U.S.C. 154(b) by 70 days.

(21) Appl. No.: 10/814,526

(22) Filed: Mar. 31, 2004

(51) Int. Cl.
*G01C 21/20* (2006.01)

(52) U.S. Cl. ............ 33/1 SD; 235/78 N; 116/DIG. 24

(58) Field of Classification Search ............ 33/1 SD, 33/1 SB, 1 SC, 1 B, 562; 235/64 NV, 78 N, 235/61 NV; D10/67; 116/DIG. 24
See application file for complete search history.

(56) References Cited

U.S. PATENT DOCUMENTS

| | | | |
|---|---|---|---|
| 1,232,120 A * | 7/1917 | Sutter, Jr. ..................... | 40/495 |
| 2,055,397 A * | 9/1936 | Zaiger ..................... | 248/206.1 |
| 2,588,433 A * | 3/1952 | Twamley ..................... | 340/979 |
| 2,996,242 A * | 8/1961 | Bannister ................... | 235/61 S |
| 3,100,601 A * | 8/1963 | Shapiro ..................... | 235/61 B |
| 3,110,965 A * | 11/1963 | Kittock ..................... | 33/1 SD |
| 3,151,310 A * | 9/1964 | Shepherd, Jr. et al. .. | 340/995.27 |
| 3,190,950 A * | 6/1965 | Ariessohn et al. .......... | 340/979 |
| 3,262,640 A * | 7/1966 | Jameson ................... | 235/78 R |
| 3,315,887 A * | 4/1967 | Martin, Jr. ............. | 235/61 NV |
| 3,844,042 A * | 10/1974 | Hodge ........................ | 33/1 SD |
| 4,154,190 A * | 5/1979 | Utgoff ........................ | 116/335 |
| 4,274,204 A * | 6/1981 | Self .......................... | 33/1 SD |
| 4,559,705 A * | 12/1985 | Hodge et al. ................. | 33/1 B |
| 5,214,855 A * | 6/1993 | Gibbs ........................ | 33/1 SD |
| 5,553,387 A * | 9/1996 | Newcomb ................... | 33/1 SD |
| D377,942 S * | 2/1997 | McCloy ....................... | D18/10 |
| 6,167,627 B1 * | 1/2001 | Wilder et al. .............. | 33/1 SD |
| 6,658,746 B1 * | 12/2003 | Ganivet ..................... | 33/1 SB |
| 6,740,355 B1 * | 5/2004 | Thiemann ................... | 427/202 |
| 6,950,731 B1 * | 9/2005 | English ........................ | 701/16 |
| 2006/0012492 A1 * | 1/2006 | Degidio ..................... | 340/971 |
| 2006/0020374 A1 * | 1/2006 | Kenner .......................... | 701/3 |

OTHER PUBLICATIONS

Ace's Pilot Shop, "Ace's Pilot Shop Flight Computers", Dec. 23, 2002, as provided by the Internet Archive Wayback Machine on Feb. 17, 2006, p. 1.*

* cited by examiner

*Primary Examiner*—R. Alexander Smith
(74) *Attorney, Agent, or Firm*—Bradley Arant Rose &White, LLP

(57) ABSTRACT

Disclosed is a navigational assist system to assist a pilot or other person in the entry into an entry environment, such as a holding pattern or runway traffic pattern. The navigational assist system is comprised of a plurality of entry determining elements moveably secured to one another upon which is placed information to assist in the entry into an entry environment. In one embodiment three entry determining elements are used, with the entry determining elements corresponding to the following: (i) one entry determining element for determination of the advised standard entry procedure for entry into a holding pattern; (ii) one entry determining element for determination of the advised non-standard entry procedure for entry into a holding pattern; and (iii) one entry determining element for determination of the advised entry procedure for entry into a runway traffic patterns.

28 Claims, 2 Drawing Sheets

NAVIGATIONAL ASSIST SYSTEM

FIELD OF THE DISCLOSURE

The present disclosure relates to navigational aids. In particular, the present disclosure relates to navigational aids to allow the determination of the advised entry procedure for holding patterns and runway traffic patterns.

BACKGROUND

The determination of how to correctly enter a holding pattern or a runway traffic pattern is one many pilots face every day. Under current regulations, the Federal Aviation Administration (FAA) has set forth a series of recommended entries to holding patterns and runway traffic patterns. While standardizing such entries, it has been said that the level of effort required to correctly enter a holding pattern requires a level of effort that is disproportionate with the importance of the task. Many pilots, even experienced ones, suffer unneeded anxiety over entry into holding patterns and runway traffic patterns. Prior to 1961, there was no FAA authorized entry procedures for entering a holding pattern or a runway traffic pattern. For instance, prior to 1961, a pilot simply flew to the designated holding fix of a holding pattern, turned in the shortest direction to the outbound radial. The shortest turn back to the fix would establish the pilot in the racetrack holding pattern. While simple, the procedure gave no standardized procedure and required that increased airspace be set aside for the designation of holding patterns to account for the variability of entry.

As the speed of aircraft increased and the airspace became more crowded, errors in entry to the patterns became magnified. In response the FAA created a set of recommended entry procedures for entering holding patterns and runway traffic patterns. The present disclosure provides a navigational assist disk system for use by pilots of all experience levels that allows the pilot to determine the advised method of entry into recommended holding patterns and runway traffic patterns. Through the use of the navigational assist disk system of the present disclosure, pilot anxiety is decreased, and flight safety is increased by allowing the pilot to direct his attention to flight matters other than the determination of the advised entry procedure at hand.

DETAILED DESCRIPTION

The navigational assist system of the present disclosure is comprised of a plurality of entry determining elements moveably secured to one another upon which is placed information to assist a pilot or other person in the entry into an entry environment, such as a holding pattern or runway traffic pattern. In one embodiment three entry determining elements are used, with the entry determining elements corresponding to the following: (i) one entry determining element for determination of the advised standard entry procedure for entry into a holding pattern (element A, designated as A in FIGS. 1 and 2); (ii) one entry determining element for determination of the advised non-standard entry procedure for entry into a holding pattern (element B, designated B in FIGS. 1 and 3); and (iii) one entry determining element for determination of the advised entry procedure for entry into a runway traffic patterns (element C, designated as C in FIGS. 1 and 4). The order of placement of the entry determining elements may be any desired by the user. In one embodiment, the order of placement is element C on the bottom, element A on top and element B between element A and element C. In an alternate embodiment, fewer than three entry determining elements are used and can be selected from those identified above.

In one embodiment, the entry determining elements are clear plastics elements of any desirable shape or configuration. In one embodiment, the clear plastic elements are circular disks and are made of clear plastic material. In one embodiment, the disks are approximately 2 and ¾ inches in diameter with a thickness of 3/16 of an inch. Other dimensions may be used as appropriate. It should be noted that each entry determining element may be the same shape or may be a different shape. In one embodiment, element A is a first shape, element B is a second shape and element C is a third shape. This will allow the pilot to easily identify the appropriate entry disk for the given situation. Appropriate shapes may be a circle, an oval, a square, a rectangle, a triangle, a hexagon, a pentagon and other geometric shapes. In addition, the entry determining elements may have different dimensions. With reference to the example in the preceding paragraph, element C may be larger than element B and element B may be larger than element A. Furthermore, the entry determining elements may have a different texture for each entry procedure. For example, element A may have a smooth surface, element B may have a rough surface and element C may have a ridged surface. Any other texture may be used as desired, with the above being exemplary in nature only. Such textures will allow the pilot to select the appropriate entry determining element without being required to remove his attention from the environment.

Figure 1:
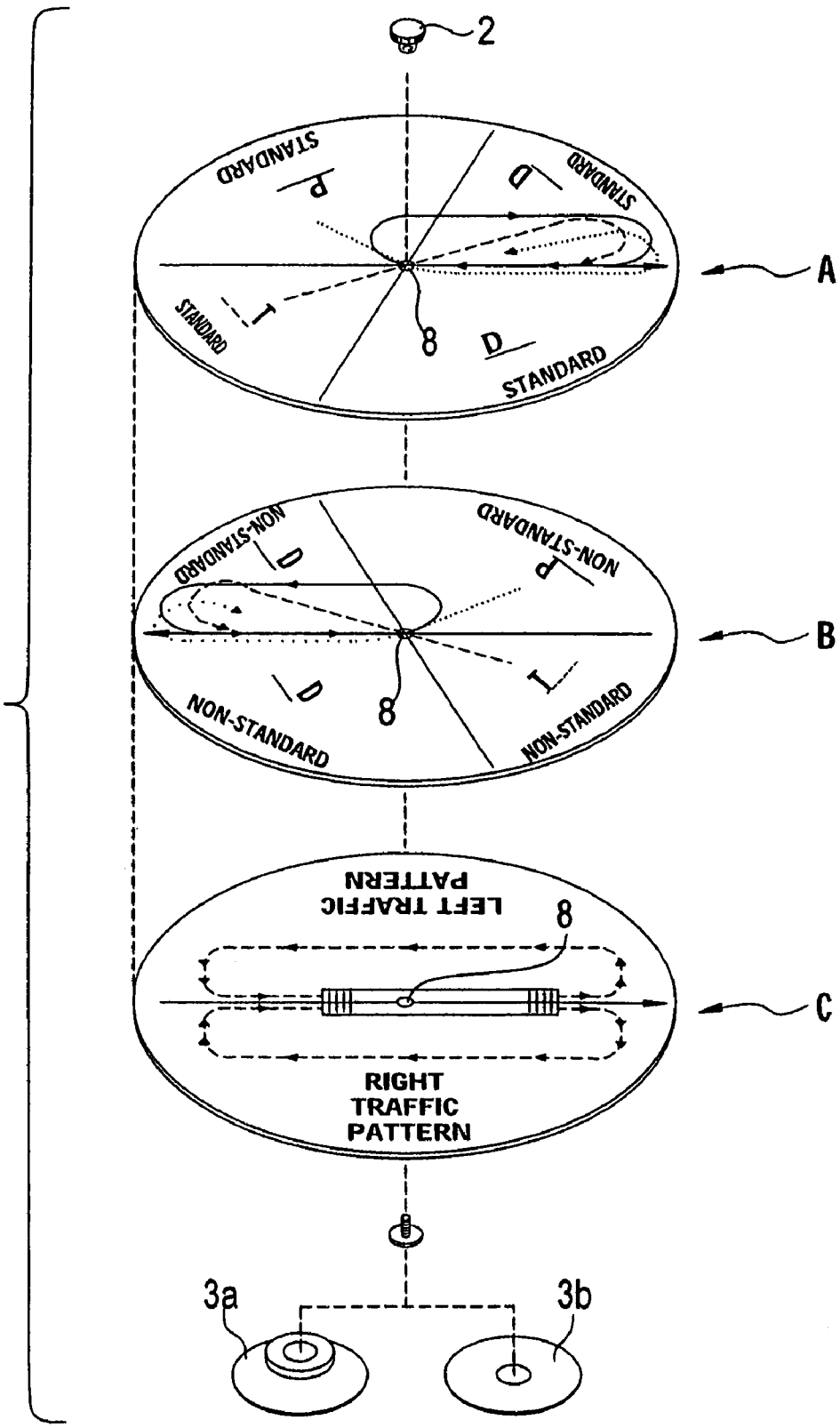
FIG. 1 shows one embodiment of the device of the present disclosure illustrating the three disks of the device.

An opening (designated 8) is placed in the center of each entry determining element. A means for securing may be used to moveably secure the entry determining elements to one another. In one embodiment, the means for securing is a thumbscrew, brad, rivet or similar element. In one embodiment, a thumbscrew with a knurled outer circumference is used to allow ease of manipulation. The means for securing produces a semi-tight friction so that the entry determining elements will rotate and stop at a given position and not spin freely (FIG. 1). The means for securing may be removable, so that the pilot may rearrange the order of the entry determining elements.

The means for securing may be secured to a means for attachment to allow the navigational assist disk system to be removable attached to a surface. In one embodiment, the means for attachment is a suction cup. In an alternate embodiment, the means for attachment is a section of static cling plastic secured to the backside of one of the disk. The means for attachment will allow the navigational assist disk system to be placed and removed as desired during use.

The entry determining elements are divided into a plurality of entry designating sectors by at least one line that extends across at least a portion on the entry determining element. Each entry designating sector is associated with an entry determining label to identify the advised entry procedure for the given entry environment. In addition, the entry designating sector may be associated with an entry plan designator that visually displays to the pilot the aircraft maneuvers required for advised entry to the entry environment. Then at least one line above will comprise a reference element (such as an arrowhead or similar element) to allow orientation of the appropriate entry determining element with a directional heading corresponding to the appropriate entry environment on an appropriate navigational instrument. The process of orientation of the reference element with the appropriate directional heading determines the orientation of the aircraft with respect to the entry environment (referred to as the "initial orientation") and allows the navigational assist disk system to determine the recommended entry procedure for the given entry environment based on the initial orientation. In this manner, the navigational assist disk system assists the pilot in entering a given entry environment, such as a holding pattern or runway traffic pattern. Further details for specific entry environments are discussed below. The navigational assist disk system may be placed on the glass face of the heading indicator (such as a directional gyroscope) or other appropriate radio, indicator or other equipment as desired via the use of the means for attachment.

Standard and Non-Standard Holding Patterns

A complete explanation of holding procedures can be found in the *Federal Aviation Regulations and Aeronautical Information Manual* (FAR/AIM, 2004) and will serve as reference for this description as it relates to use of the navigational assist system. The information below is taken from the FAR/AIM, 2004, and describes the basics for each type of entry into a holding pattern. The procedures below are indicated in graphical form by the entry plan designators.

Parallel Procedure: When approaching the holding fix from anywhere in entry designating sector P, the parallel entry procedure would be to turn to a heading parallel to the holding course outbound on the nonholding side of the holding course for a given distance or period of time as directed by air traffic control (ATC), turn in the direction of the holding pattern through more than 180 degrees, and return to the holding fix or intercept the holding course inbound.

Teardrop Procedure: When approaching the holding fix from anywhere in entry designating sector T, the teardrop entry procedure would be to fly to the fix, turn outbound to a heading for a 30 degree teardrop entry within the pattern (on the holding side) for a given distance or period of time as directed by ATC, then turn in the direction of the holding pattern to intercept the inbound holding course.

Direct Entry Procedure: When approaching the holding course from anywhere in entry designating sector D, the direct entry procedure would be to fly directly to the fix and turn to follow the holding pattern.

While other entry procedures may enable the aircraft to enter the holding pattern and remain within protected airspace, the parallel, teardrop, and direct entries are the procedures for entry and holding as recommended by the FAA. In addition, the procedures above can be used with distance measuring equipment as well as time values, as directed by ATC.

Figure 2:
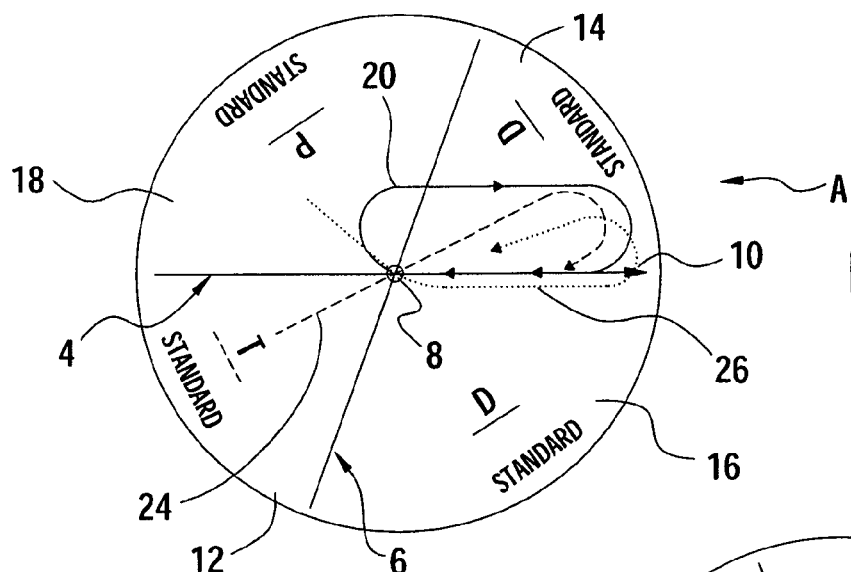
FIG. 2 shows one embodiment of the disk for determining the advised recommended entry procedure for entry into a holding pattern.
Figure 3:
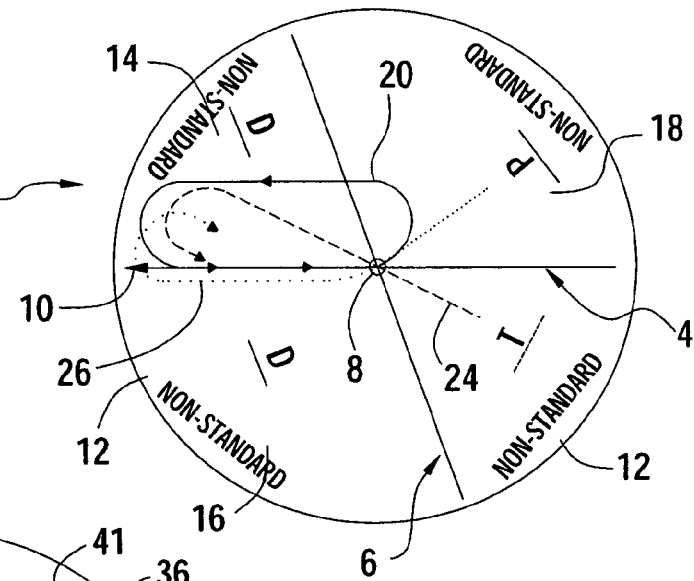
FIG. 3 shows one embodiment of the disk for determining the advised non-standard entry procedure for entry into a holding pattern.
Figure 4:
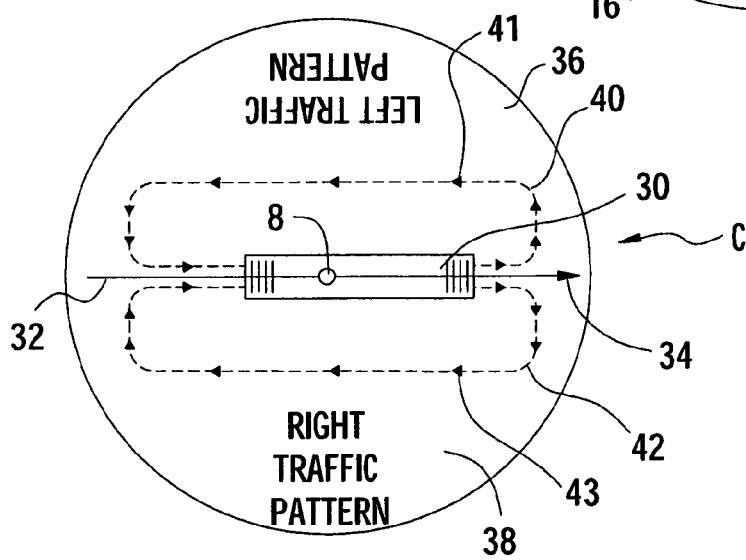
FIG. 4 shows one embodiment of the assist disk system for determining the advised entry procedure for entry into a runway traffic pattern.

For standard and non-standard holding patterns the diagram design for the entry determining elements is discussed below and illustrated in FIGS. 2 and 3, respectively. The terminology used to discuss entry patterns is that commonly used in the field. As is known, a standard entry indicates to the pilot that right hand turns of the aircraft will be employed, while a non-standard entry indicates to the pilot that left hand turns of the aircraft will be employed. For both standard (FIG. 2) and non-standard (FIG. 3) entry into holding patterns, each entry determining element (labeled A in FIG. 2 and B in FIG. 3) will have two lines, 4 and 6, along the full length of the diameter of the entry determining element that bisect each other at point 8 to create the entry designating sectors by creating two angles of 70 degrees and two angles of 110 degrees. As is illustrated in FIGS. 2 and 3, line 4 has reference element, indicated as arrowhead 10, at one end (in one embodiment, the arrowhead 10 is located on the outer periphery of the disk). The reference element allows orientation of the entry determining element with the directional heading corresponding to the outbound radial of the holding pattern. By aligning the reference element with the heading of the outbound radial of the holding pattern, the initial orientation of the aircraft with respect to the holding pattern is determined. The intersection of lines 4 and 6 (point 8) is the fix point. A diagram of the standard racetrack holding pattern is also displayed and labeled 20. The function of the lines 4 and 6 is to define the outbound radial, to determine the position of the standard race track-shaped holding pattern, and to divide the entry determining element into three entry designating sectors composed of sections 12 and 14 (70 degree angles) and 16 and 18 (110 degree angles).

Each entry designating sector has an entry designating label associated with it to inform the pilot of the appropriate holding pattern entry procedure as advised under current FAA guidelines. In the embodiments illustrated in FIGS. 1 and 2, the entry designating labels are T, which informs the pilot a teardrop entry procedure is advised, P, which informs the pilot a parallel entry procedure is advised, and D which informs the pilot a direct entry procedure is advised. Other entry designating labels may also be used. In an alternate embodiment, the following entry designating labels are used: (a) for a parallel entry procedure; (b) for a teardrop entry procedure; and (c) for a direct entry procedure. The entry designating labels may be distinguished from one another through the use of colors, shading or hatching or any combination of the foregoing.

In addition, each entry designating label may be associated with an entry plan designator. The entry plan designators provide the pilot with a visual representation of the maneuvers the aircraft will be required to perform to perform the advised entry procedure indicated by the entry designating labels to enter the holding pattern. The entry plan designators may be any designator that can be visually distinguished by the pilot. The entry plan designators may be distinguished from one another through the use of line colors or line configuration (such as solid lines, dashed lines and dotted lines) or a combination of the two. In the embodiment illustrated in FIGS. 2 and 3, the entry plan designators are a dashed line 24 associated with the entry designating label T and a dotted line 26 associated with the entry designating label P. In the examples provided, there is no entry plan designator associated with the entry plan designator D, since the proper entry suggested by entry plan designator D is to fly directly to the fix. However, a solid line may be as the entry plan designator to illustrate an exemplary entry if desired. As discussed above, the exact embodiments of the entry plan designators are exemplary alone and may be varied as discussed.

With the disk in position on the heading indicator or other appropriate navigational instrument, it will assume a position in the vertical plane and viewed en face. When the reference element, arrowhead 10 in FIGS. 2 and 3, is in line with the outbound radial of the holding pattern, the initial orientation of the aircraft with respect to the holding pattern is determined and the proper entry designating sector is placed at the bottom of the entry determining elements. The pilot reads determines the advised entry procedure by observing the entry designating label (T, P and D, or other such labels as may be used) associated with bottom entry designating sector and may also observe the entry plan designator to observe the maneuvers required for the suggested entry procedure.

Runway Traffic Patterns

The options for runway traffic pattern entry are right traffic or left traffic and the entry of choice is unique to individual runways. This information is published in the airport facility directory or as provided by the air traffic controller (ATC). For runway traffic patterns, the diagram design for the entry determining element (designated C) is discussed below and illustrated in FIG. 4. A sample runway is illustrated and designated as 30. A single line designated 32 bisects the entry determining element and the runway 30. The line 32 comprises a reference element, indicated as arrowhead 34. The function of line 32 is to define the runway heading (in conjunction with the reference element) and to divide the entry determining element into two entry designating sectors, designated 36 and 38. The reference element allows orientation of the entry determining element with the directional heading corresponding to the runway. By aligning the reference element with the heading of the runway, the initial orientation of the aircraft with respect to the runway is determined.

Each entry designating sector may have an entry designating label associated with it to inform the pilot of the appropriate runaway traffic pattern entry procedure as advised under current FAA guidelines. In the embodiment illustrated in FIG. 4, the entry designating labels are L, which informs the pilot a left entry procedure is advised and R, which informs the pilot a right entry procedure is advised. Other entry designating labels may also be used. In an alternate embodiment, the following entry designating labels are used: Left for a left entry; Right for a right entry; Left Traffic Pattern for a left entry; or Right Traffic Pattern for a right entry. Other entry designating labels may also be used. The entry designating labels may be distinguished from one another through the use of colors, shading or hatching or similar methods.

In addition, each entry designating label may be associated with an entry plan designator. The entry plan designators provide the pilot with a visual representation of the maneuvers the aircraft will be required to perform to enter the runaway traffic patterns indicated by the entry designating labels. The entry plan designators may be any designator that can be visually distinguished by the pilot. The entry plan designators may be distinguished from one another through the use of line colors or line configuration (such as solid lines, dashed lines and dotted lines) or a combination of the two. In the embodiment illustrated in FIG. 4, the entry plan designators are each dashed lines 40 and 42 illustrating the standard racetrack entry patterns with arrowheads 41 and 43, respectively, delineating the general direction of flight upon entering the runway traffic pattern. As discussed above, the exact embodiments of the entry plan designators are exemplary alone and may be varied as discussed.

With the disk in position on the heading indicator or other appropriate navigational instrument, it will assume a position in the vertical plane and viewed en face. When approaching the runway complex, the reference element, arrowhead 34, is aligned with the runway heading. The proper entry determining element for runway traffic pattern entry (L or R) specific for the given runway is consulted. The small arrowheads within the entry plan designators (L or R) on the appropriately labeled entry designating label will assist the pilot in determining proper traffic pattern entry.

EXAMPLES

Holding Pattern Entry

Example 1

The holding pattern fix is a VHF Omni-directional Radio (VOR) and the pattern is standard on the 090 degree outbound radial. The aircraft track inbound to the fix is 120 degrees. The pilot will affix the navigational assist disk system to the directional gyroscope (or other appropriate instrument) face plate via the means for attachment and turn the proper entry determining element such that the reference element, arrowhead 10, aligns with the outbound radial, 090 degrees. In this manner the initial orientation of the aircraft with respect to the holding pattern is established. The navigational assist disk system display the proper entry designating sector at the bottom of the element and the pilot views the entry designating labels to determine the advised entry procedure and the entry plan designator (if used) to visualize the maneuvers required to execute the advised entry procedure. In this example, the navigational assist disk system informs the pilot that a parallel entry into the holding pattern is advised. The entry plan designator (if used) associated with the entry designating label will assist the pilot in visualizing the maneuvers required for a parallel entry into the actual holding pattern.

Example 2

The holding pattern fix is a VOR and the pattern is standard on the 090 degree outbound radial. The aircraft track inbound to the fix is 050 degrees. The pilot will affix the navigational assist disk system to the directional gyroscope (or other appropriate instrument) face plate via the means for attachment and turn the proper entry determining element such that the reference element, arrowhead 10, aligns with the outbound radial, 090 degrees. In this manner the initial orientation of the aircraft with respect to the holding pattern is established. The navigational assist disk system display the proper entry designating sector at the bottom of the element and the pilot views the entry designating labels to determine the advised entry procedure and the entry plan designator (if used) to visualize the maneuvers required to execute the advised entry procedure. In this example, the navigational assist disk system informs the pilot that a teardrop entry into the holding pattern is advised. The entry plan designator (if used) associated with the entry designating label will assist the pilot in visualizing the maneuvers required for a teardrop entry into the actual holding pattern.

Example 3

The holding pattern fix is a VOR and the pattern is standard on the 090 degree outbound radial. The aircraft track inbound to the fix is 280 degrees. The pilot will affix the navigational assist disk system to the directional gyroscope (or other appropriate instrument) face plate via the means for attachment and turn the proper entry determining element such that the reference element, arrowhead 10, aligns with the outbound radial, 090 degrees. In this manner the initial orientation of the aircraft with respect to the holding pattern is established. The navigational assist disk system display the proper entry designating sector at the bottom of the element and the pilot views the entry designating labels to determine the advised entry procedure and the entry plan designator (if used) to visualize the maneuvers required to execute the advised entry procedure. In this example, the navigational assist system informs the pilot that a direct entry into the holding pattern is advised. The entry plan designator (if used) associated with the entry designating label will assist the pilot in visualizing the maneuvers required for a direct entry into the actual holding pattern.

Example 4

The holding pattern fix is a VOR and the pattern is nonstandard on the 270 degree outbound radial. The aircraft track inbound to the fix is 190 degrees. The pilot will affix the navigational assist disk system to the directional gyroscope (or other appropriate instrument) face plate via the means for attachment and turn the proper entry determining element such that the reference element, arrowhead 10, aligns with the outbound radial, 270 degrees. In this manner the initial orientation of the aircraft with respect to the holding pattern is established. The navigational assist disk system display the proper entry designating sector at the bottom of the element and the pilot views the entry designating labels to determine the advised entry procedure and the entry plan designator (if used) to visualize the maneuvers required to execute the advised entry procedure. In this example, the navigational assist disk system informs the pilot that a parallel entry into the holding pattern is advised. The entry plan designator (if used) associated with the entry designating label will assist the pilot in visualizing the maneuvers required for a parallel entry into the actual holding pattern.

Traffic Pattern Entry

Example 5

The pilot is approaching the runway complex from the north to join left traffic for runway 6 (indicating runway heading 060). The pilot will affix the navigational assist system to the directional gyroscope (or other appropriate instrument) face plate via the means for attachment and turn the proper entry determining element such that the arrowhead 34 aligns with the runway heading, 060. In this manner the initial orientation of the aircraft with respect to the runway is established. The proper entry designating sector of the element is located and the pilot views the entry designating labels and the entry plan designator to determine the proper runway traffic entry pattern. In this example, a left traffic pattern is in place for the runway. The entry plan designator associated with the entry designating label will guide the pilot to make an initial turn to the right to join the downwind leg.

What is claimed is:

1. A navigational assist system comprising a plurality of entry determining elements for determining an advised entry procedure into an entry environment, a means for attachment secured to one of said entry determining elements, said means for attachment removably securing the navigational assist system to the face of a distinct and separate navigational instrument forming a part of an aircraft said means for attachment being selected from the group consisting of a suction cup and a static cling plastic, said entry determining elements being moveably secured to one another by a means for securing so that each entry determining element is rotatably moveably with respect to the others, each of the entry determining elements comprising at least one reference element for alignment of a directional heading associated with the entry environment with said appropriate navigational instrument to determine an initial orientation of an aircraft with the entry environment and each entry determining element being divided into a plurality of entry determining sectors, with each entry determining sector being associated with an entry determining label, the entry determining label informing a user of the advised entry procedure for the entry environment based on the initial orientation thereby informing a user of the proper entry procedure for the entry environment based.

2. The system of claim 1 where the entry environment is selected from the group consisting of: a holding pattern and a runway traffic pattern.

3. The system of claim 2 where the entry determining elements are selected from the group consisting of: an entry determining element for determining the advised entry procedure for standard entry into a holding pattern, an entry determining element for determining the advised entry procedure for non-standard entry into a holding pattern, and an entry determining element for determining the advised entry procedure for entry into a runway traffic pattern.

4. The system of claim 1 further comprising an entry plan designator associated with at least one of the entry designating labels.

5. The system of claim 4 where the entry plan designators provide the user with a visual representation of a maneuver required to enter the entry environment.

6. The system of claim 5 where the entry environment is selected from the group consisting of: a holding pattern and a runway traffic pattern.

7. A navigational assist disk system comprising three entry determining elements and a means for attachment secured to one of said entry determining elements, said means for attachment removably securing the navigational assist disk system to the face of a distinct and separate navigational instrument forming a part of an aircraft and said means for attachment being selected from the group consisting of a suction cup and a static cling plastic, with two of the three entry determining elements being used to determine an advised entry procedure when the entry environment is a holding pattern and one of the three entry determining elements being used to determine an advised entry procedure when the entry environment is a runway traffic pattern, the three entry determining elements being moveably secured to one another by a means for securing so that each entry determining element is rotatably moveably with respect to the others, each of the entry determining elements comprising a reference element for alignment of a directional heading associated with the holding pattern or runway traffic pattern with said appropriate navigational instrument to determine an initial orientation of an aircraft and each entry determining element being divided into a plurality of entry determining sectors, with each entry determining sector being associated with an entry determining label, the proper entry designating sector with its associated entry determining label being displayed at the bottom of the entry determining element based on the initial orientation, thereby informing a user of the proper entry procedure for the entry environment based.

8. The system of claim 7 where the directional heading associated with the holding pattern is the outbound radial of the holding pattern and the directional heading associated with the runway traffic pattern is the runway heading.

9. The system of claim 7 where one of the two entry determining elements to determine an advised entry procedure where the entry environment is a holding pattern is used for standard entry into the holding pattern and the other of the two is used for non-standard entry into a holding pattern.

10. The system of claim 9 where the entry determining elements to determine an advised entry procedure when the entry environment is a holding pattern each comprise a set of two lines bisecting said elements, one of said lines comprising the reference element, said two lines dividing the entry determining element into four entry designating sectors.

11. The system of claim 10 where the entry determining labels associated with one of the entry designating sectors informs the pilot a parallel entry procedure is advised, the entry determining labels associated with one of the entry designating sectors informs the pilot a teardrop entry procedure is advised and the entry determining labels associated with two of the entry designating sectors informs the pilot a direct entry procedure is advised.

12. The system of claim 7 where the entry determining element to determine an advised entry procedure when the entry environment is a runway traffic pattern comprises a line bisecting the element and comprising the reference element, said line dividing the entry determining element into two entry designating sectors.

13. The system of claim 12 where the entry determining labels associated with one of the entry designating sectors informs the pilot a left entry procedure is advised or a right entry procedure is advised.

14. The system of claim 7 further comprising at least one entry plan designator associated with at least one of the entry designating labels.

15. The system of claim 14 where each entry designating label is associated with an entry plan designator.

16. The system of claim 15 where the entry plan designators provide the user with a visual representation of a maneuver required to enter the holding pattern or the runway traffic pattern.

17. The system of claim 15 where each entry plan designator comprises a visually distinguishable feature.

18. The system of claim 17 where the visually distinguishable feature is selected from the group consisting of line color, line configuration and a combination thereof.

19. The system of claim 7 where the entry determining elements each have a shape and the shape is selected from the group consisting of: a circle, an oval, a square, a rectangle, a triangle, a pentagon, a hexagon, other geometric shapes or a combination of the foregoing.

20. The system of claim 19 where the shape of each of the entry determining elements is the same.

21. The system of claim 19 where the shape of each of the entry determining elements is the different.

22. The system of claim 7 where the entry determining elements comprise a surface and each surface has a texture associated with at least a portion thereof, and the texture is selected from the group consisting of: a smooth texture, a rough texture and a ridged texture.

23. The system of claim 22 where the texture of each surface of the entry determining elements is the same.

24. The system of claim 22 where the texture of each surface of the entry determining elements is the different.

25. The system of claim 7 where the entry designating sectors have a visually distinguishable feature.

26. The system of claim 25 where the visually distinguishable feature is selected from the group consisting of: a color, a hatching pattern, a shading pattern and a combination of the foregoing.

27. The system of claim 7 where each entry designating label has a visually distinguishable feature.

28. The system of claim 27 where the visually distinguishable feature is selected from the group consisting of: a color, a line configuration and a combination of the foregoing.

* * * * *